US012649291B2

(12) United States Patent
Lenz et al.

(10) Patent No.: US 12,649,291 B2
(45) Date of Patent: Jun. 9, 2026

(54) CHEMICAL VAPOR INFILTRATION TOOLING FOR OPTIMIZING INFILTRATION IN CERAMIC MATRIX COMPOSITES

(71) Applicant: Raytheon Technologies Corporation, Farmington, CT (US)

(72) Inventors: Brendan Lenz, Wethersfield, CT (US); Mary Colby, West Hartford, CT (US); Andrew Joseph Lazur, La Jolla, CA (US); Lane M. Thornton, Tolland, CT (US); Daniel P. Preuss, Glastonbury, CT (US)

(73) Assignee: ETX Corporation, Farmington, CT (US)

( * ) Notice: Subject to any disclaimer, the term of this patent is extended or adjusted under 35 U.S.C. 154(b) by 459 days.

(21) Appl. No.: 18/118,448

(22) Filed: Mar. 7, 2023

(65) Prior Publication Data

US 2024/0300141 A1     Sep. 12, 2024

(51) Int. Cl.
B29C 70/48          (2006.01)
B28B 7/00           (2006.01)
(Continued)

(52) U.S. Cl.
CPC ............ B29C 70/48 (2013.01); B28B 7/0029 (2013.01); B29C 33/3814 (2013.01); C04B 41/4531 (2013.01)

(58) Field of Classification Search
CPC ............ B29C 33/3814; C04B 41/4529; C04B 41/4531
See application file for complete search history.

(56) References Cited

U.S. PATENT DOCUMENTS 3,991,248 A     11/1976  Bauer
4,909,914 A      3/1990  Chiba et al.
(Continued)

FOREIGN PATENT DOCUMENTS

CN          107266099 A     10/2017
CN          115181959 A     10/2022
(Continued)

OTHER PUBLICATIONS

Machine translation of CN 107266099m retrieved from EPO database Oct. 9, 2025 (Year: 2025).*
(Continued)

*Primary Examiner* — Timothy Kennedy
(74) *Attorney, Agent, or Firm* — Kinney & Lange, P.A.

(57)          ABSTRACT

A tooling fixture suitable for use in infiltrating a fibrous preform with a flow of reactant gas includes an outer surface and an inner surface defining a thickness therebetween, and a plurality of holes extending through the thickness of the tooling fixture. The plurality of holes includes a first hole having cylindrical geometry with a first pair of dimensions comprising a first length and a first diameter, a second hole having cylindrical geometry with a second pair of dimensions comprising a second length and a second diameter, and a third hole having cylindrical geometry with a third pair of dimensions comprising a third length and a third diameter. At least one dimension of the first pair of dimensions is different from at least one dimension of the second pair of dimensions, and at least one dimension of the second pair of dimensions is different from at least one dimension of the third pair of dimensions.

16 Claims, 5 Drawing Sheets

(51) Int. Cl.
  *B29C 33/38* (2006.01)
  *C04B 41/45* (2006.01)

(56) References Cited

U.S. PATENT DOCUMENTS

| | | | |
|---|---|---|---|
| 5,217,755 A | 6/1993 | Thebault et al. | |
| 6,415,736 B1 * | 7/2002 | Hao ..................... H10P 72/0402 | |
| | | | 156/345.43 |
| 8,845,806 B2 * | 9/2014 | Aida ................. C23C 16/45525 | |
| | | | 156/345.43 |
| 10,906,205 B2 | 2/2021 | Thibaud et al. | |
| 10,906,842 B2 | 2/2021 | Shi et al. | |
| 11,046,620 B2 | 6/2021 | Shim et al. | |
| 11,332,827 B2 | 5/2022 | Agarwal et al. | |
| 2001/0050059 A1 | 12/2001 | Hongo et al. | |
| 2007/0079934 A1 | 4/2007 | Murata et al. | |
| 2012/0097330 A1 | 4/2012 | Iyengar et al. | |
| 2012/0103264 A1 | 5/2012 | Choi et al. | |
| 2015/0214009 A1 | 7/2015 | Glukhoy | |
| 2017/0114462 A1 | 4/2017 | Zhang et al. | |
| 2018/0340257 A1 | 11/2018 | Achary et al. | |
| 2020/0061868 A1 | 2/2020 | Thibaud et al. | |
| 2020/0123066 A1 | 4/2020 | Shi et al. | |
| 2020/0123067 A1 | 4/2020 | Freeman et al. | |
| 2020/0308703 A1 | 10/2020 | Agarwal et al. | |
| 2022/0195606 A1 | 6/2022 | Borkowski et al. | |
| 2023/0047104 A1 | 2/2023 | Parzefall | |

FOREIGN PATENT DOCUMENTS

| | | | |
|---|---|---|---|
| EP | 3805424 A1 | 4/2021 | |
| JP | S58176196 A | 10/1983 | |
| JP | 5093165 B2 | 9/2012 | |
| JP | 7164632 B2 | 10/2022 | |

OTHER PUBLICATIONS

Partial Search Report for EP Application No. 24161857.8, dated Jul. 17, 2024, 11 pages.
Extended European Search Report for EP Application No. 24161794. 3, dated Oct. 11, 2024, 15 pages.
Extended European Search Report for EP Application No. 24161861. 0, dated Oct. 23, 2024, 15 pages.
Extended European Search Report for EP Application No. 24161857. 8, dated Dec. 19, 2024, 13 pages.

\* cited by examiner

CHEMICAL VAPOR INFILTRATION TOOLING FOR OPTIMIZING INFILTRATION IN CERAMIC MATRIX COMPOSITES

BACKGROUND

The present invention relates to chemical vapor infiltration (CVI), and more particularly to improved tooling for CVI.

Ceramic matrix composite (CMC) parts are widely fabricated by applying an interface coating (IFC) to preforms made from woven fabrics or oriented/braided fiber tows. To keep the preforms in a rigid form and maintain proper shape and geometry, perforated tooling can be used to hold the preforms during the initial densification cycle(s). Holes in the tooling allow vaporous precursors to infiltrate into the preform for the deposition of a ceramic matrix. Tooling for simple preform shapes can be designed with uniform hole lengths. When used with complexly-shaped preforms such as turbine vanes and blades, vaporous precursors may not sufficiently infiltrate the preform at certain locations through such holes. The result can be undesirable variation in deposition rate and effective IFC thickness, which can drive differences in mechanical behavior and durability of the CMC part. Thus, a need exists for improved tooling.

SUMMARY

A tooling fixture suitable for use in infiltrating a fibrous preform with a flow of reactant gas includes an outer surface and an inner surface defining a thickness therebetween, and a plurality of holes extending through the thickness of the tooling fixture. The plurality of holes includes a first hole having cylindrical geometry with a first pair of dimensions comprising a first length and a first diameter, a second hole having cylindrical geometry with a second pair of dimensions comprising a second length and a second diameter, and a third hole having cylindrical geometry with a third pair of dimensions comprising a third length and a third diameter. At least one dimension of the first pair of dimensions is different from at least one dimension of the second pair of dimensions, and at least one dimension of the second pair of dimensions is different from at least one dimension of the third pair of dimensions.

A tooling fixture suitable for use in infiltrating a fibrous preform with a flow of reactant gas includes a plurality of holes extending through a thickness of the tooling fixture. For at least a subset of the plurality of holes, each hole of the subset has a cylindrical geometry with a length and a diameter. The length ranges from 0.50 in to 0.75 in.

A tooling fixture suitable for use in infiltrating a fibrous preform with a flow of reactant gas includes a plurality of holes extending through a thickness of the tooling fixture. For at least a subset of the plurality of holes, each hole of the subset has a cylindrical geometry with a length and a diameter. The diameter is 0.125 in.

Figure 1A:
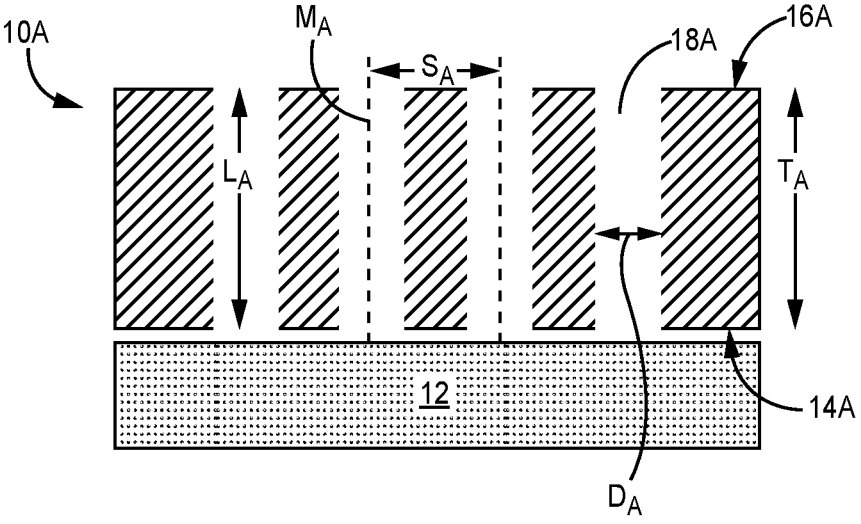
FIG. 1A is a simplified cross-sectional illustration of a tooling fixture with infiltration hole parameters according to a first embodiment.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents tooling fixtures with varied infiltration hole parameters within a tooling fixture leading to more uniform IFC deposition on a preform. During IFC formation, reactant gas must travel through the infiltration holes of the tooling fixture to reach the enclosed preform. The concentration of reactant gas can decay along the path length (i.e., hole length) due to reaction/deposition of precursors within the gas with/on the inner surfaces of the holes. Hole length and diameter can be varied to minimize these effects. Hole spacing can also be reduced increase hole concentration in a given area. Multiple types of holes with varied dimensions (i.e., length and diameter) and/or spacing can further be incorporated into a single tooling fixture to create a continuous path length gradient, as necessary, to mitigate decay and ensure a more uniform deposition.

Figure 1B:
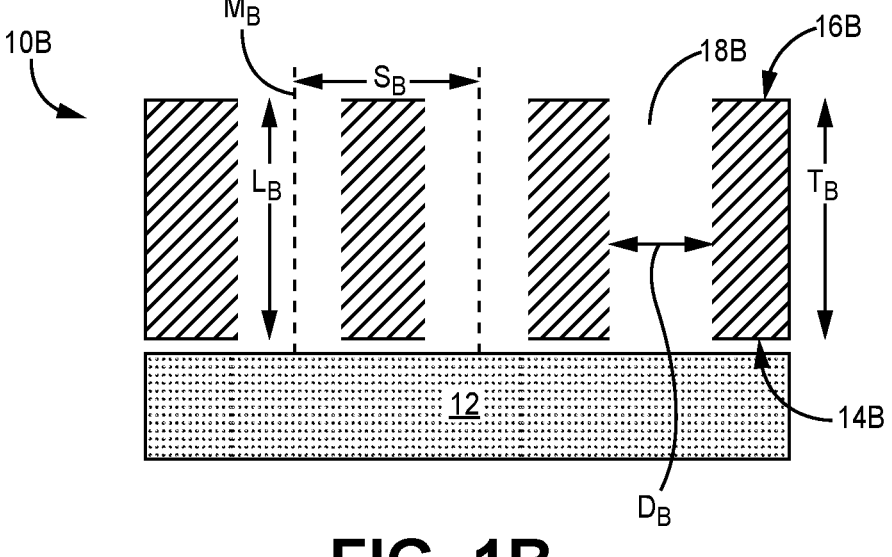
FIG. 1B is simplified cross-sectional illustration of a tooling fixture with infiltration hole parameters according to a second embodiment.
Figure 1C:
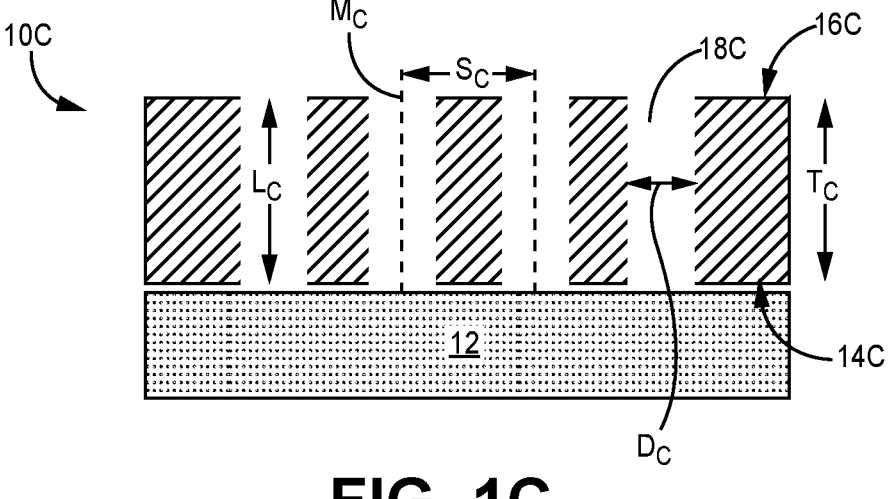
FIG. 1C is a simplified cross-sectional illustration of a tooling fixture with infiltration hole parameters according to a third embodiment.

FIGS. 1A, 1B, and 1C are simplified enlarged cross-sectional illustrations of alternative infiltration holes 18A, 18B, and 18C, respectively, for a tooling fixture. FIGS. 1A, 1B, and 1C are discussed together.

FIG. 1A illustrates a portion/side of tooling fixture 10A and enclosed preform 12. Tooling fixture 10A can, in an exemplary embodiment, be formed from graphite. In an alternative embodiment, tooling fixture 10A can be all or partially formed from refractory metal alloys, carbon-carbon composites, and/or a ceramic (e.g., silicon carbide, aluminum oxide, boron nitride, etc.). Preform 12 can be formed from tows of silicon carbide (SiC) fibers arranged in one of various two or three-dimensional woven architectures such as plain, harness (e.g., 3, 5, 8, etc.), twill, braid, or non-symmetric to name a few non-limiting examples. In an alternative embodiment, preform 12 can be formed from non-woven (e.g., chopped, felted, etc.) fibers. Tooling fixture 10A can at least partially surround preform 12 to help maintain the shape of preform 12 during CVI. Tooling fixture 10A and preform 12 can each include straight and/or curved segments depending on the geometry desired in the final CMC part.

Tooling fixture 10A includes inner (preform-facing) surface 14A, oppositely disposed outer surface 16A, and thickness $T_A$ extending from outer surface 16A to inner surface 14A. Thickness $T_A$ need not be uniform across the entirety of tooling fixture 10A, although FIG. 1A depicts a section of uniform thickness. Tooling fixture 10A further includes holes 18A, each with a length $L_A$ and extending completely through thickness $T_A$ such that $L_A=T_A$. Holes 18A have a cylindrical geometry, forming a rectangular cross-sectional area as shown in the view of FIG. 1A, with a circular cross-sectional area in a transverse direction. Hole 18A accordingly has a uniform diameter $D_A$ along length $L_A$, and a volume defined by $\pi(\frac{1}{2} D_A)^2 L_A$. Holes 18A can be dimensionally uniform with respect to one another. Each hole 18A can be spaced apart from an adjacent hole 18A a uniform distance $S_A$, as measured from midpoint $M_A$ to adjacent midpoint $M_A$. The dimensions $T_A$ and $L_A$ can range from 0.25 in to 1.25 in (6.35 mm to 31.75 mm). Diameter $D_A$ can be 0.125 in (3.175 mm). Based on such individual hole dimensions, it can be desirable to reduce hole-to-hole spacing such that, for a given area of tooling fixture 10A, there are more holes 18A and/or greater concentration of open space than in a standard tooling fixture. Such reduced spacing can be employed in all or part(s) of tooling fixture 10A to increase hole concentration, at least locally, to help control IFC deposition across preform 12 to ensure greater IFC uniformity. Accordingly, spacing $S_A$ can range from 0.15 in to 0.24 in (3.8 mm to 6.1 mm), and can more specifically range from 0.15 in to 0.20 in (3.8 mm to 5.1 mm). During CVI, the flow of reactant gas travels through holes 18A in the direction from outer surface 16A to inner surface 14A, such that hole length $L_A$, as shown, is aligned with the flow direction through a respective hole 18A.

FIG. 1B illustrates tooling fixture 10B supporting preform 12. Tooling fixture 10B can be distinct from tooling fixture 10A, or it can be a separate section/wall of a common tooling fixture incorporating tooling fixture 10A. Tooling fixture 10B is substantially similar to tooling fixture 10A having a thickness TB extending from inner surface 14B to outer surface 16B, or vice versa. Tooling fixture 10B includes holes 18B, which are similarly cylindrical and dimensionally uniform with respect to one another. Each hole 18B has a length $L_B$, a diameter $D_B$, and a volume defined by $\pi(\frac{1}{2} D_B)^2 L_B$. Each hole 18B is spaced apart from an adjacent hole 18B a uniform distance $S_B$. In the embodiment shown in FIG. 1B, $L_B=T_B$, and each can range from 0.25 in to 1.25 in. In order to reduce the effects of decay of reactant gas concentration, hole diameter can be manipulated. More specifically, diameter $D_B$ can be increased, relative to diameter $D_A$, to 0.175 in (4.45 mm). Accordingly, spacing $S_B$ between adjacent midpoints $M_B$ can be relatively larger than spacing $S_A$ in general, and can range from 0.20 in to 0.30 in (5.1 mm to 7.6 mm). A larger diameter hole 18B can permit a greater flow volume of reactant gases to pass through than a single hole 18A, where $L_B$ and $L_A$ are otherwise equal. During CVI, the flow of reactant gas travels through holes 18B in the direction from outer surface 16B to inner surface 14B, such that hole length $L_B$, as shown, is aligned with the flow direction through a respective hole 18B.

FIG. 1C illustrates tooling fixture 10C supporting preform 12. Tooling fixture 10C can be distinct from tooling fixtures 10A and 10B, or it can be a separate section/wall of a common tooling fixture incorporating tooling fixtures 10A and/or 10C. Tooling fixture 10C is substantially similar to tooling fixtures 10A and 10B, having a thickness $T_C$ extending from inner surface 14C to outer surface 16C. Tooling fixture 10C includes holes 18C, which are similarly cylindrical and dimensionally uniform with respect to one another. Each hole 18C has a length $L_C$, a diameter $D_C$, and a volume defined by $\pi(\frac{1}{2} D_C)^2 L_C$. Each hole 18C is spaced apart from an adjacent hole 18C a uniform distance $S_C$. In the embodiment shown in FIG. 1C, $L_C=T_C$, but each can be shorter relative to the same dimensions of holes 18A and

18B. More specifically, $L_C$ and $T_C$ can range from 0.25 in to 0.75 in (6.35 mm to 19.0 mm). Spacing $S_C$ between adjacent midpoints $M_C$ can be greater than spacing $S_A$ while still falling with a range of 0.15 in to 0.20 in. Diameter $D_C$ can be 0.125 in, like diameter $D_A$. Accordingly, the effects of decay are predominantly controlled in the embodiment of FIG. 1C by reducing the path length (i.e., $L_C$) the reactant gases must travel to reach preform 12. Such reduction limits exposure of the inner surface of each hole 18C to reactant gases thus reducing reaction with/deposition on the inner surface. During CVI, the flow of reactant gas travels through holes 18C in the direction from outer surface 16C to inner surface 14C, such that hole length $L_C$, as shown, is aligned with the flow direction through a respective hole 18C.

Figure 2:
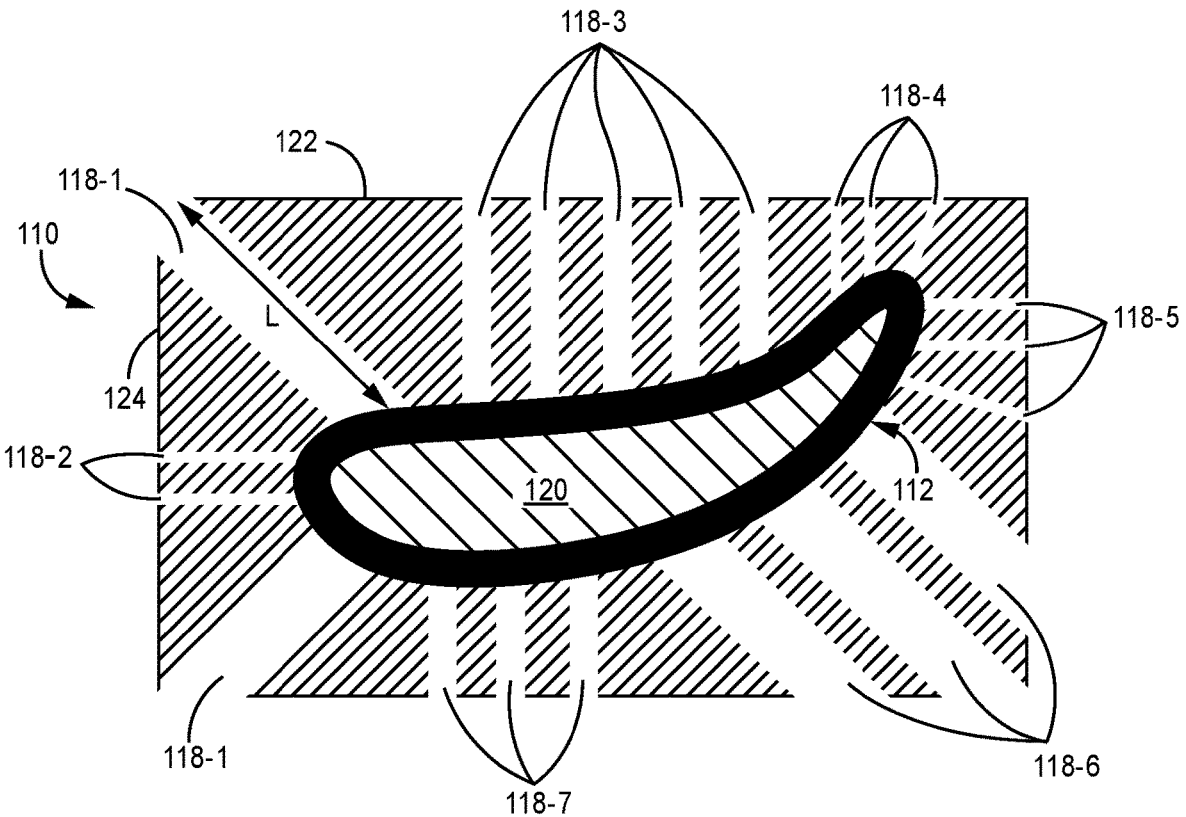
FIG. 2 is a simplified cross-sectional illustration of a variable thickness tooling fixture having varied infiltration hole parameters.

FIG. 2 is a simplified cross-sectional illustration of tooling fixture 110 supporting airfoil-shaped preform 112, which can become part of a CMC blade or vane for a gas turbine engine. Preform 112 is also mounted on mandrel 120 in the embodiment shown. Tooling fixture 110 has a rectangular cross-sectional geometry with opposing long sides 122 and opposing short sides 124. Tooling fixture 110 has a variable thickness in order to conform to the curvature of preform 112, and accordingly includes a variable infiltration hole pattern. More specifically, tooling assembly 110 includes individually varied and/or groups of variously sized holes collectively and/or generically referred to as "hole(s) 118". More specifically, tooling fixture 110 includes seven groups of holes: 118-1, 118-2, 118-3, 118-4, 118-5, 118-6, and 118-7.

Holes 118 can be cylindrical with dimensions (i.e., length and diameter) similar to those labeled in FIGS. 1A-1C. Each hole 118 of a single group (e.g., holes 118-2) can be substantially similar in length and diameter, while in other groups (e.g., holes 118-3) each hole can be substantially similar in one dimension (e.g., diameter) while varying in the other (e.g., length). Each hole 118 in a particular group can be dimensionally different than the other holes 118 in the same group in an alternative embodiment. Each group can vary dimensionally from at least one other group and/or share dimensional similarities with at least one other group. For example, some groups (e.g., 118-1 and 118-6) can be dimensionally similar to one another with respect to diameter, but can differ (e.g., be larger) in diameter than the others. Larger diameters may be preferred in thicker regions of tooling assembly 110, that is, regions having longer path/hole lengths L (labeled in one hole 118-1) along which reactant gases must travel to reach preform 112. Such regions can be found, for example, near the corners of tooling fixture 110 and/or regions corresponding to regions of greater curvature in preform 112. Various holes 118 can further be oriented normal to the surface of preform 112, and/or at an angle with respect to preform 112, as shown in FIG. 2. Alternative embodiments of tooling fixture 110 can include more or fewer than seven types/groups of holes 118, generally having two to n types of holes 118 with different lengths and/or diameters based on the complexity of preform 112 and/or tooling fixture 110. Holes 118 need not be arranged in clustered groups (i.e., adjacent to one another) as shown, rather can be alternatingly arranged about tooling fixture 110 in various patterns with intervening types of holes (e.g., holes 118-2 between holes 118-1). In yet another alternative embodiment, each hole 118 of tooling fixture 110 can be different in at least one dimension from every other hole 118, such that hole dimensions vary across the entirety of tooling fixture 110.

Figure 3:
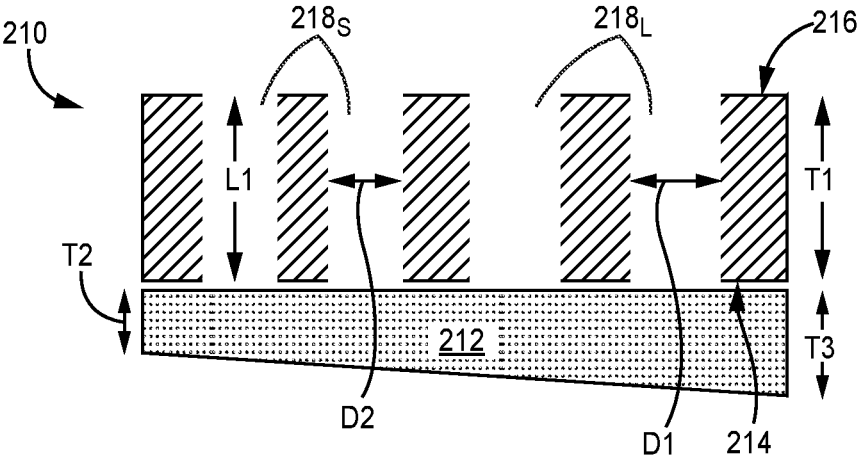
FIG. 3 is a simplified cross-sectional illustration of a tooling fixture for a variable thickness preform having varied infiltration hole parameters.

FIG. 3 is a simplified cross-sectional illustration of tooling fixture 210 supporting variable thickness preform 212.

As shown, tooling fixture 210 and preform 212 can each be portions of a larger structure or assembly. Preform 212 can be an airfoil for a vane or blade, like preform 110 of FIG. 2, with relatively thick regions (e.g., a leading edge or an insert/filler region). Preform 212 can alternatively be vane or blade platform, a blade outer airseal (BOAS), or other variable thickness structure. Tooling fixture 210 can have a uniform thickness T1, at least in the section shown, if not throughout the entire tooling fixture 210. Thickness T1 extends between inner surface 214 to outer surface 216. Tooling fixture 210 includes two types of holes, larger diameter holes $218_L$ and smaller diameter holes $218_S$ (collectively referred to as "holes 218"). As used herein, the terms "larger" and "smaller" are relative to one another, and more specifically, to the relative diameters, with larger diameter holes $218_L$ having a first diameter D1, and smaller diameter holes $218_S$ having a second, smaller diameter D2. In one embodiment, D1=0.175 in and D2=0.125 in. Holes 218 can each have the same length, L1, where L1=T1. Holes 218 can each have cylindrical three-dimensional geometries, with each larger diameter hole $218_L$ having a volume defined by $\pi(\frac{1}{2} D1)^2 L1$, and each smaller diameter hole $218_S$ having a volume defined by $\pi(\frac{1}{2} D2)^2 L1$. Larger diameter holes $218_L$ can be uniform with respect to one another, and smaller diameter holes $218_S$ can be uniform with respect to one another.

As shown in FIG. 3, preform 212 expands from a region with thickness T2 to a maximum thickness of T3, where T3>T2. Although shown increasing generally linearly from end to end, the thickness of preform 212 can transition curvilinearly or in a stepwise manner in alterative embodiments. In order to optimize IFC deposition, holes 218 can correspondingly transition from smaller diameter holes $218_S$ where preform 212 is relatively thin (i.e., proximate thickness T2) to larger diameter holes $218_L$ where preform 212 is relatively thick (i.e., proximate thickness T3). This can expose relatively thick regions of preform 212 to a greater volume of reactant gases for a given amount of CVI process time, facilitating sufficient IFC deposition on such regions. Alternative embodiments of tooling fixture 210 can include more than two types of holes (e.g., three to n types of holes 218) with different diameters depending, for example, on the dimensions and/or variable thickness regions of preform 212.

Holes 18A, 18B, and/or 18C can be incorporated into a single tooling fixture, such as the tooling fixture discussed above with respect to FIGS. 2 and/or 3. Holes 18A, 18B, 18C, 118, and 218 can be formed in the associated tooling fixture using a laser or mechanical drilling technique. Although the disclosed holes are referred to as cylindrical holes with circular cross-sectional dimensions (e.g., diameters), non-cylindrical holes with alternative dimensions (e.g., widths) are contemplated herein. The disclosed tooling fixtures can be used to form CMC components for aerospace, maritime, or industrial equipment, to name a few, non-limiting examples.

Discussion of Possible Embodiments

The following are non-exclusive descriptions of possible embodiments of the present invention.

A tooling fixture suitable for use in infiltrating a fibrous preform with a flow of reactant gas includes an outer surface and an inner surface defining a thickness therebetween, and a plurality of holes extending through the thickness of the tooling fixture. The plurality of holes includes a first hole having cylindrical geometry with a first pair of dimensions comprising a first length and a first diameter, a second hole having cylindrical geometry with a second pair of dimensions comprising a second length and a second diameter, and a third hole having cylindrical geometry with a third pair of dimensions comprising a third length and a third diameter. At least one dimension of the first pair of dimensions is different from at least one dimension of the second pair of dimensions, and at least one dimension of the second pair of dimensions is different from at least one dimension of the third pair of dimensions.

The tooling fixture of the preceding paragraph can optionally include, additionally and/or alternatively, any one or more of the following features, configurations and/or additional components:

In the above tooling fixture, the first length can be different from the second length.

In any of the above tooling fixtures, the second diameter can be different from the third diameter.

Any of the above tooling fixtures can further include a fourth hole having cylindrical geometry with a fourth pair of dimensions comprising a fourth length and a fourth diameter, and a fifth hole having cylindrical geometry with a fifth pair of dimensions comprising a fifth length and a fifth diameter. At least one dimension of the fourth pair of dimensions is different from at least one dimension of the fifth pair of dimensions, and at least one dimension of the fifth pair of dimensions is different from at least one dimension of the first, second, or third dimensions.

In any of the above tooling fixtures, the fourth diameter can be different from the fifth diameter, and the fourth length can be different from the fifth length.

Any of the above tooling fixtures can further include a plurality of first holes, a plurality of second holes, and a plurality of third holes.

In any of the above tooling fixtures, the tooling fixture can be formed from at least one of graphite, a refractory metal alloy, a carbon-carbon composite, and a ceramic material.

In any of the above tooling fixtures, each hole of the plurality of holes can be disposed to direct the flow of reactant gas to a surface of the fibrous preform.

In any of the above tooling fixtures, the fibrous preform can be formed from silicon carbide.

In any of the above tooling fixtures, the fibrous preform can be shaped like an airfoil.

In any of the above tooling fixtures, at least one hole of the plurality of holes can be angled with respect to the surface of the fibrous preform.

In any of the above tooling fixtures, at least one hole the plurality of holes can be oriented normal to the surface of the fibrous preform.

A tooling fixture suitable for use in infiltrating a fibrous preform with a flow of reactant gas includes a plurality of holes extending through a thickness of the tooling fixture. For at least a subset of the plurality of holes, each hole of the subset has a cylindrical geometry with a length and a diameter. The length ranges from 0.50 in to 0.75 in.

The tooling fixture of the preceding paragraph can optionally include, additionally and/or alternatively, any one or more of the following features, configurations and/or additional components:

In the above tooling fixture, the diameter can be 0.125 in.

In any of the above tooling fixtures, each hole of the subset can be uniformly spaced apart from an adjacent hole of the subset a distance ranging from 0.20 in to 0.24 in.

In any of the above tooling fixtures, the diameter can be 0.165 in.

In any of the above tooling fixtures, the tooling fixture can be formed from at least one of graphite, a refractory metal alloy, a carbon-carbon composite, and a ceramic material.

A tooling fixture suitable for use in infiltrating a fibrous preform with a flow of reactant gas includes a plurality of holes extending through a thickness of the tooling fixture. For at least a subset of the plurality of holes, each hole of the subset has a cylindrical geometry with a length and a diameter. The diameter is 0.125 in.

The tooling fixture of the preceding paragraph can optionally include, additionally and/or alternatively, any one or more of the following features, configurations and/or additional components:

In the above tooling fixture, each hole of the subset can be uniformly spaced apart from an adjacent hole of the subset a distance ranging from 0.20 in to 0.24 in.

In any of the above tooling fixtures, the length can range from 0.25 in to 0.50 in.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tooling fixture suitable for use in infiltrating a fibrous preform with a flow of reactant gas, the tooling fixture comprising:

an outer surface and an inner surface defining a thickness therebetween, the inner surface configured to be disposed adjacent to the fibrous preform; and a plurality of holes extending through the thickness of the tooling fixture, the plurality of holes comprising:

a first hole having cylindrical geometry about a first axis with a first pair of dimensions comprising a first length and a first diameter, wherein the first diameter, measured orthogonal to the first axis, is uniform throughout the first hole;

a second hole having cylindrical geometry about a second axis with a second pair of dimensions comprising a second length and a second diameter, wherein the second diameter, measured orthogonal to the second axis, is uniform throughout the second hole, the second diameter less than the first diameter; and a third hole having cylindrical geometry about a third axis with a third pair of dimensions comprising a third length and a third diameter, wherein the third diameter, measured orthogonal to the third axis, is uniform throughout the third hole; and wherein the first hole is located to be disposed proximate a first location of the preform and wherein the second hole is located to be disposed proximate a second location of the preform, wherein the first location of the preform is thicker than the second location of the preform.

2. The tooling fixture of claim 1, wherein the first length is different from the second length.

3. The tooling fixture of claim 1, wherein the second diameter is different from the third diameter.

4. The tooling fixture of claim 1 and further comprising:

a fourth hole having cylindrical geometry with a fourth pair of dimensions comprising a fourth length and a fourth diameter; and a fifth hole having cylindrical geometry with a fifth pair of dimensions comprising a fifth length and a fifth diameter;

wherein at least one dimension of the fourth pair of dimensions is different from at least one dimension of the fifth pair of dimensions; and wherein at least one dimension of the fifth pair of dimensions is different from at least one dimension of the first, second, or third dimensions.

5. The tooling fixture of claim 4, wherein the fourth diameter is different from the fifth diameter, and wherein the fourth length is different from the fifth length.

6. The tooling fixture of claim 1 and further comprising:

a plurality of first holes;

a plurality of second holes; and a plurality of third holes.

7. The tooling fixture of claim 1, wherein the tooling fixture is formed from at least one of graphite, a refractory metal alloy, a carbon-carbon composite, and a ceramic material.

8. The tooling fixture of claim 1, wherein each hole of the plurality of holes is disposed to direct the flow of reactant gas to a surface of the fibrous preform.

9. The tooling fixture of claim 8, wherein the fibrous preform is formed from silicon carbide.

10. The tooling fixture of claim 9, wherein the fibrous preform is shaped like an airfoil.

11. The tooling fixture of claim 1, wherein at least one hole of the plurality of holes is oriented at an oblique angle with respect to the outer surface of the tooling fixture.

12. The tooling fixture of claim 8, wherein at least one hole the plurality of holes is oriented normal to the outer surface of the tooling fixture.

13. The tooling fixture of claim 1, wherein the tooling fixture has a first thickness at a location of the first hole and has a second thickness at a location of the second hole, wherein the first thickness is greater than the second thickness.

14. The tooling fixture of claim 13, wherein the first hole is disposed through a corner region defined on the outer surface of the tooling fixture.

15. The tooling fixture of claim 1, wherein the thickness of the tooling fixture is uniform.

16. The tooling fixture of claim 1, wherein the inner surface of the tooling fixture has a curved shape and wherein the first hole opens to a region on the inner surface of greater curvature and the second hole opens to a region on the inner surface of reduced curvature.

* * * * *